United States Patent [19]
Bauer et al.

[11] Patent Number: 5,669,440
[45] Date of Patent: Sep. 23, 1997

[54] HEAT EXCHANGER HAVING A WELDED PIPE WHICH HAS A REDUCED WALL THICKNESS AT LOCATION OF THE WELD SEAM

[75] Inventors: Dieter Bauer, Stuttgart; Ralf Bochert, Remseck; Herbert Damsohn, Aichwald; Werner Helms; Roland Hemminger, both of Esslingen; Herbert Hunzelmann, Marxzell; Volker Kurz, Stuttgart; Roland Schirrmacher, Ludwigsburg; Walter Wolf, Oppenweiler-Zell, all of Germany

[73] Assignee: BEHR GmbH & Co., Stuttgart, Germany

[21] Appl. No.: 577,378

[22] Filed: Dec. 22, 1995

[30] Foreign Application Priority Data

Dec. 24, 1994 [DE] Germany ............ 44 46 563.7

[51] Int. Cl.⁶ .................................................. F28F 1/02
[52] U.S. Cl. .................. 165/177; 138/171; 29/890.053; 165/DIG. 537
[58] Field of Search ............... 165/177; 138/171; 228/166; 29/890.053

[56] References Cited

U.S. PATENT DOCUMENTS

| | | | |
|---|---|---|---|
| 1,643,227 | 9/1927 | Stresau | 138/171 X |
| 2,730,135 | 1/1956 | Wallace | 138/171 |
| 3,186,063 | 6/1965 | Dopp | 138/171 X |
| 4,558,695 | 12/1985 | Kumazawa et al. | 228/183 |
| 4,815,651 | 3/1989 | Malwitz | 228/173.2 |
| 5,558,159 | 9/1996 | Kato | 165/153 |

FOREIGN PATENT DOCUMENTS

| | | | |
|---|---|---|---|
| 725403 | 8/1942 | Germany | 165/177 |
| 1 165 787 | 3/1964 | Germany . | |
| 3 323 622 | 1/1984 | Germany . | |
| 3 636 198 | 4/1988 | Germany . | |
| 3 916 225 | 11/1990 | Germany . | |
| 62-220217 | 9/1987 | Japan | 138/171 |

OTHER PUBLICATIONS

Mitt. Forschungsgesellschaft Blechverarbeitung, 1952, Nr. 8, p. 85.

*Primary Examiner*—Allen J. Flanigan
*Attorney, Agent, or Firm*—Foley & Lardner

[57] ABSTRACT

A heat exchanger, produced by the insertion of welded pipes into a rib pack, has a good connection between the rib pack and the pipes after expansion of the pipes. An optimal contact of the pipes against the passages in the cooling fins of the rib pack is achieved because the weld base of the welded pipe lies in a recess. The recess is formed by reduction of the wall thickness of a strip material from which the welded pipe is produced.

20 Claims, 1 Drawing Sheet

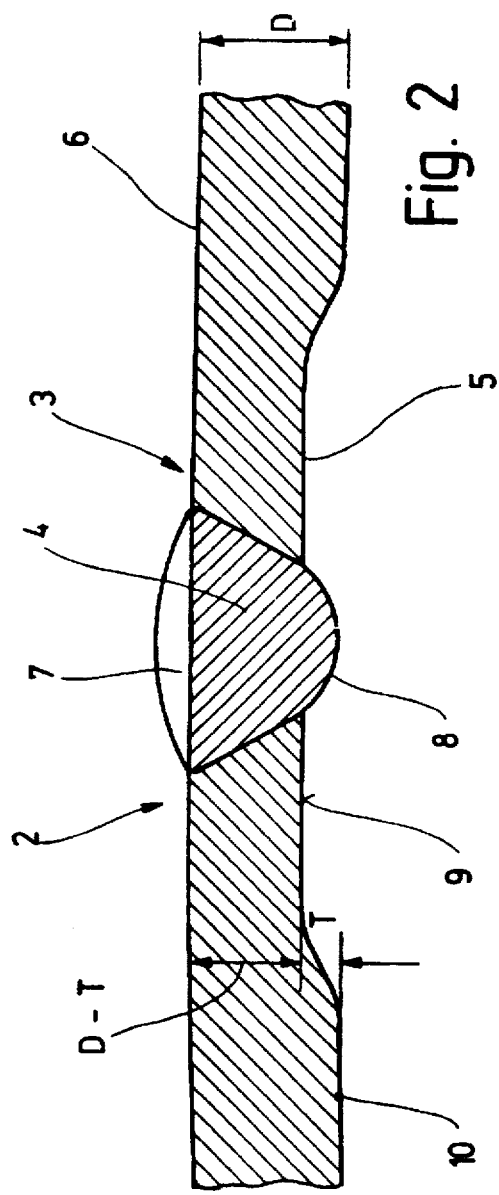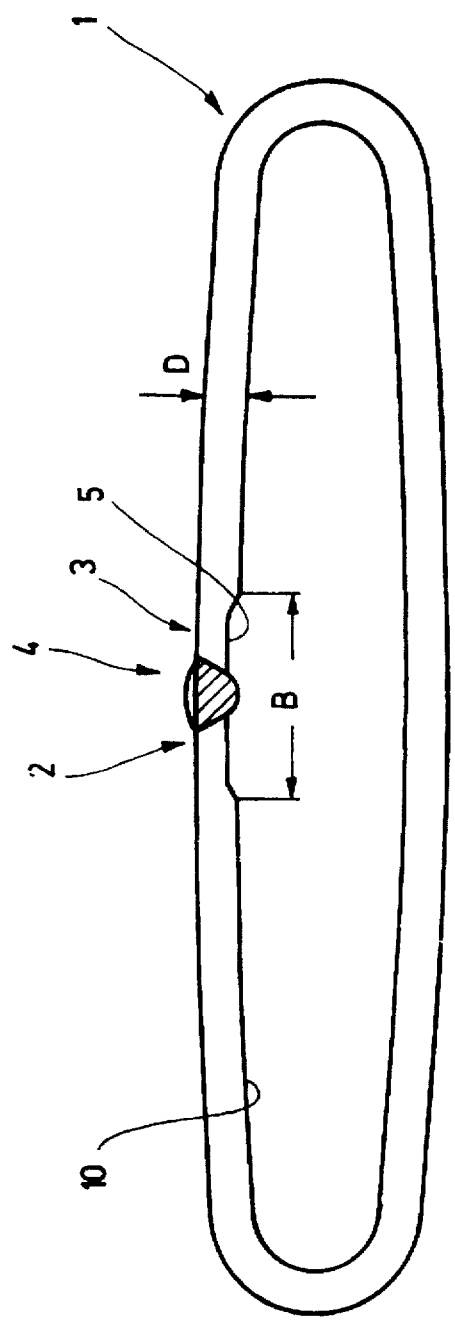

HEAT EXCHANGER HAVING A WELDED PIPE WHICH HAS A REDUCED WALL THICKNESS AT LOCATION OF THE WELD SEAM

BACKGROUND OF THE INVENTION

1. Field of the Invention

The invention relates to a heat exchanger having one or more pipes and having one or more cooling fins passed through by the pipes. The pipes have a weld seam which extends in the longitudinal direction and which is formed from welding together strip edges of a strip material. The invention also relates to pipes of this type and to a process for the production of the heat exchanger and the pipes.

2. Background of the Invention

It is generally known that the network of a heat exchanger is constructed from a plurality of cooling fins, which are passed through by a plurality of pipes. In order to obtain an optimal heat transfer from the pipes to the cooling fins or vice versa, the cooling fins must bear against the outer wall of the pipes with the greatest possible surface area.

This is achieved by the following. After the pipes have been inserted into the rib pack, the pipes are expanded. Alternatively, the pipes can be soldered to the individual cooling fins. For soldering purposes, the outer surfaces of the pipes are plated with solder material. The solder material is melted in a soldering furnace and the solder connection is thereby created. In order to lower the production costs of the heat exchanger, efforts have been made to create the connection of the rib pack and pipes by an expansion of the pipes, since, in such cases, the plating can be spared.

Seamless-produced pipes, i.e. drawn, pressed or shaped pipes, are particularly suitable for expansion, but they are more costly than welded pipes, so that the benefit enjoyed from improved expansion is offset.

The use of welded pipes, on the other hand, is problematic. In welded pipes, even though the part of the weld seam which juts over the outer surface of the pipe is planed off, a removal of the part of the weld seam which juts over the inner surface of the pipe is generally not possible. This weld-base overhang would however, when the pipe is expanded, on the one hand give rise to excessive wearing of the expansion tool, since the weld base is very hard. Moreover, the expansion of the pipe in the region of the weld seam would be insufficient or at least ill-defined, since the expansion tool would be borne against not by the inner wall of the pipe but by the weld-base overhang.

Further, since the site of the weld base varies for round pipes and for oval pipes, the expansion tool cannot be provided with a groove to receive the weld-base overhang. Even if such a groove can be provided, the groove would need to be designed extremely wide, which has the associated drawback that no expansion or stretching of the pipe can occur in the region near this groove. The result therefore would be a poor contact, if any, between this pipe region and the fins. A pipe-rib connection having such poor contact between the pipe region and the fins exhibits poor heat-transfer characteristics.

SUMMARY OF THE INVENTION

An object of this invention is to provide a heat exchanger and a pipe, as well as a process for their production, in which the pipe-rib connection exhibits better heat-transfer characteristics.

The above and other objects of the invention are accomplished with a heat exchanger having one or more pipes produced from a strip material whose edges are joined together by a weld seam. In the region where the strip edges are joined together, there is a smaller wall thickness than in other regions of the strip material. In particular, a recess is provided in the region where the strip edges are joined together. The recess runs in the direction of the weld seam.

With this design according to the invention, i.e. with the recess in the region of the weld seam, the basic advantage is that, as a result of the recess, a smaller weld-base overhang is produced, so that the problems stated in the introduction have a less serious effect during expansion. Since the recess is advantageously provided on the inner surface of the pipe, the large part of the weld-base overhang is located in the region of the recess and is not covered by the expansion tool. Under optimal welding conditions, the recess is formed by a chamfer which faces the inner side of the pipe. The recess which is formed by the chamfer or a plurality of chamfers can be filled wholly or partially by the weld base.

In the preferred embodiment, the width of the recess in the pipe is less than or equal to five times the wall thickness of the pipe. In this case, the recess has the additional function of being able to receive dirt and break-away particles of the weld base, e.g. weld grit or the like, when the expanding mandrel is introduced into the pipe. Where the depth of the recess is smaller than the weld-base overhang, the recess forms a displacement space for the weld base itself. The expansion tool then displaces that part of the weld base which protrudes radially inwardly over the recess sideways into the free space of the recess.

In the preferred embodiment, the depth of the recess is less than or equal to 40%, in particular, one third to one quarter of the wall thickness of the pipe. When the recess is of such a depth, the weakening of the pipe resulting from a reduction in the wall thickness has only minor significance. Particularly where the recess is filled by weld material, the wall weakening is negligible.

A further feature of the invention is that the pipes can be round, flat or plane-oval pipes. The invention can thus be used in virtually all known heat exchangers.

Further advantages, features and details of the invention will be set forth in the following description, in which a preferred embodiment is described in detail with reference to the drawings. The features which are shown in the drawings and described in the description and claims can in each case be fundamental to the invention either individually in their own right or in an optional combination.

BRIEF DESCRIPTION OF THE DRAWINGS

The invention is described in detail herein with reference to the drawings in which:

FIG. 1 shows a cross section through a welded pipe according to the invention; and FIG. 2 shows an enlarged cross section of the weld-seam region of the welded pipe according to the invention.

DETAILED DESCRIPTION OF THE PREFERRED EMBODIMENT

FIG. 1 illustrates a plane-oval pipe which has been produced by a strip material (not shown) which was first bent into circular form and whose strip edges 2 and 3 were joined together by means of a weld seam 4. The pipe 1 is then shaped into the illustrated shape. Prior to the shaping of the flat strip material, the strip edges 2 and 3 are rolled, such that the wall thickness D is reduced. As a result of the rolling procedure, a recess 5 is produced on the strip edges 2 and 3 having a depth T which is ¼±⅛ of the wall thickness D. In the illustrated embodiment, the wall thickness D is 0.4 mm and the depth T of the recess 5 is 0.1 mm. The width B of the recess 5 is roughly five times the wall thickness D, i.e. in the present case, about 2 mm. From FIGS. 1 and 2, it can be additionally seen that the transition from the wall thickness D into the region of the recess 5 takes place gradually, so that notch stresses can be avoided.

Following the connection of the two strip edges 2 and 3 by means of the weld seam 4, the portion 7 of the weld seam 4 which juts over the outer surface 6 is planed off, so that the weld seam 4 is flush with the outer surface 6. A continuous contact of the pipe 1 against the passages in a rib pack or the pipe bottom is thereby guaranteed. On the inner side of the pipe 1 there is a weld-base overhang 8, which juts over the inner surface 9 of the pipe 1. For average welds, the overhang amounts to no more than the depth T of the recess 5. The sunken weld-base overhang 8 does not therefore impair the expansion of the pipe 1. In general, the recess 5 is configured to have a width B, which is only slightly larger than the width of the weld-base overhang 8.

If the overhang of the weld base is greater than the depth T of the recess 5, when the pipe 1 is expanded, the portion of the weld-base overhang 8 which projects into the recess 5 is displaced sideways within the free space of the recess 5. Such a displacement is possible due to the small amount of material to be displaced and the proportionally larger volume of recess 5. In addition, when the pipe 1 is expanded, i.e. upon the introduction of the expansion tool, the recess 5 serves as a receiving space for dirt and for particles breaking away from the weld base during the expansion, e.g. weld grit, thereby preventing the dirt and particles from impairing the expansion procedure. Furthermore, since, in the pipe 1 according to the invention, the weld-base overhang protrudes only slightly from the inner contour 10 of the pipe 1, during expansion of the welded pipe 1, the expansion tool is placed under no greater stress than when a drawn, seamless pipe is expanded.

Using the pipe 1 according to the invention, heat exchangers, in particular its pipes, can now be produced by expansion. Because welded pipes 1 are cheaper, heat exchangers having the welded pipes according to the invention are less costly to produce than heat exchangers having drawn pipes or soldered pipe/rib connections.

In embodiments having pipes of a cross section other than a circular cross section, e.g. in the illustrated embodiment, the weld seams are located in the region having a large radius of curvature (e.g. minor axis region). When pipes of this type are expanded, the region of the large radius of curvature, i.e. the substantially flat region, is exposed to lower expansion stresses. Thus, the wall thickness can here be reduced without any loss of strength. Moreover, when a welded round pipe is shaped into a flat or plane-oval form, the deformations are substantially smaller in the region of the large radius of curvature than in regions of smaller radii of curvature (e.g. major axis region).

As a basic material for the production of the pipes, aluminum strips, or special steel strips are used. In general, strips made from any weldable material can be used. In addition, the strip material can consist of a laminated material, i.e. can be plated on one or both sides. In particular, the plating consists of a hard-solder material.

In a pipe for a heat exchanger having the above-specified features, the recess is preferably produced on the strip material by machine-cutting or non-cutting methods, e.g. is rolled.

The process for the production of the pipe 1 according to the invention is described next. The weld seam of the pipe extends in the longitudinal direction of the pipe and the pipe is produced by shaping a strip material. The wall thickness of at least one of the strip edges to be welded together is reduced prior to the welding.

The reduction in the wall thickness of the strip edges is realized prior to the welding and is achieved, for example, by chamfering or rolling the strip edge. Following the rolling procedure, the width of the strip material can be calibrated by trimming. For example, in the case of plated strip material, in which the plating can be applied on one or both sides, rolling is preferred, since the plating is not, in this case, worn away.

According to the invention, following completion of the welding procedure, the portion of the weld seam which protrudes over the outer surface is planed off. The outer contour of the pipe thus has a shape which corresponds to the opening or passage in the rib pack, thereby ensuring an optimal contact of the pipe outer surface against the ribs.

Following completion of the welding procedure, the pipe can be shaped into a flat or plane-oval form. Thus, heat exchangers having pipes of optional shape and corresponding ribs can be produced. An optimal expansion and hence good contact of the pipe outer surface against the ribs can also be realized, in spite of welded pipes. In this case, the pipe bears not only against the rib pack but also over a large area against the pipe bottom and is able, where necessary, to be welded or soldered to the latter. Where the outer sides of the pipes are plated, it is also possible for the pipes to be soldered to the rib pack. A good heat transfer is thereby obtained and the heat exchanger is heat-resistant over a large temperature range of a few 100° C.

While particular embodiments according to the invention have been illustrated and described above, it will be clear that the invention can take a variety of forms and embodiments within the scope of the appended claims.

We claim:

1. A pipe comprising a weld seam formed from a welding together of strip edges of a strip material, wherein at least one of the strip edges has a reduced wall thickness defining a recess on an inner surface of the pipe.

2. The pipe as claimed in claim 1, wherein the weld seam runs in a longitudinal direction of said pipe.

3. The pipe as claimed in claim 1, wherein the pipe has a plane-oval form.

4. The pipe as claimed in claim 1, wherein inner and outer surfaces of the pipe are plated.

5. A heat exchanger comprising a pipe having a weld seam which runs in a longitudinal direction of said pipe and which is formed from a welding together of strip edges of a strip material, wherein said pipe has, in a region of the weld seam, a recess running in the direction of the weld seam and along an inner surface of the pipe.

6. The heat exchanger as claimed in claim 4, wherein the recess is formed by a chamfer.

7. The heat exchanger as claimed in claim 4, wherein the width of the recess is less than or equal to five times the wall thickness of the pipe.

8. The heat exchanger as claimed in claim 7, wherein the depth of the recess is less than or equal to 40% of the wall thickness of the pipe.

9. The heat exchanger as claimed in claim 8, wherein the depth of the recess is one third to one quarter of the wall thickness of the pipe.

10. The heat exchanger as claimed in claim 4, wherein the pipe has a cross section selected from a group consisting of round, flat and plane-oval shapes.

11. The heat exchanger as claimed in claim 10, wherein the weld seam is located in a region of the pipe which has a largest radius of curvature.

12. The heat exchanger as claimed in claim 4, wherein the pipe consists of a laminated material.

13. The heat exchanger as claimed in claim 12, wherein inner and outer surfaces of the pipe are plated.

14. A process for the production of a welded pipe, in which a weld seam extends in a longitudinal direction of the pipe, comprising the steps of:

shaping a strip material having at least two strip edges;

reducing a wall thickness of at least one strip edge of the strip material; and welding the strip edges together such that the reduced wall thickness of said at least one strip edge defines a recess along an inner surface of the pipe.

15. The process as claimed in claim 14, wherein the wall thickness is reduced by chamfering.

16. The process as claimed in claim 14, wherein the wall thickness is reduced by rolling.

17. A process for the production of a welded pipe, in which a weld seam extends in a longitudinal direction of the pipe, comprising the steps of:

shaping a strip material having at least two strip edges;

reducing a wall thickness of at least one strip edge of the strip material;

welding the strip edges together; and shaping the pipe into a plane-oval form.

18. The process as claimed in claim 14, further comprising the step of planing off the weld seam which protrudes over an outer surface of said pipe.

19. A process for the production of a welded pipe, in which a weld seam extends in a longitudinal direction of the pipe, comprising the steps of:

shaping a strip material having at least two strip edges;

reducing a wall thickness of at least one strip edge of the strip material;

welding the strip edges together; and inserting the pipe into a rib pack and radially expanding the pipe.

20. The process as claimed in claim 19, wherein the pipe is secured to the rib pack by one of soldering and welding.

* * * * *